United States Patent
Matsumoto

(10) Patent No.: US 11,516,446 B2
(45) Date of Patent: Nov. 29, 2022

(54) TILING SCREEN AND MULTI-PROJECTION SYSTEM

(71) Applicant: SEIKO EPSON CORPORATION, Tokyo (JP)

(72) Inventor: Tetsuo Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/198,303

(22) Filed: Mar. 11, 2021

(65) Prior Publication Data
US 2021/0289179 A1    Sep. 16, 2021

(30) Foreign Application Priority Data
Mar. 11, 2020 (JP) ............................. JP2020-041633

(51) Int. Cl.
*H04N 9/31* (2006.01)
*G03B 37/04* (2021.01)

(52) U.S. Cl.
CPC ........... *H04N 9/3147* (2013.01); *G03B 37/04* (2013.01); *H04N 9/3105* (2013.01)

(58) Field of Classification Search
CPC .. H04N 9/3147; H04N 9/3105; H04N 9/3182; H04N 9/3185; G03B 37/04; G03B 21/60
See application file for complete search history.

(56) References Cited

U.S. PATENT DOCUMENTS

| | | | |
|---|---|---|---|
| 8,251,512 B2* | 8/2012 | Adkins | H04N 9/3147 353/30 |
| 2002/0070944 A1* | 6/2002 | Deering | G06T 3/0081 345/581 |
| 2008/0095468 A1* | 4/2008 | Klemmer | H04N 9/3194 382/285 |
| 2008/0246781 A1* | 10/2008 | Surati | H04N 9/3194 345/581 |
| 2008/0259223 A1* | 10/2008 | Read | H04N 9/3147 353/30 |
| 2017/0070711 A1* | 3/2017 | Grundhofer | H04N 9/3185 |

FOREIGN PATENT DOCUMENTS

JP    H11-288041 A    10/1999
JP    2018-81262 A    5/2018

* cited by examiner

*Primary Examiner* — Paulos M Natnael
(74) *Attorney, Agent, or Firm* — Dority & Manning, P.A.

(57) ABSTRACT

The tiling screen (screen) is provided with a plurality of projection areas, and includes an overlapping area where end parts of the projection areas overlap each other, wherein when setting a number of times of overlapping to one in the overlapping area, reflectance in the overlapping area where the number of times is one is configured to be lower than reflectance in an area where the projection areas fail to overlap each other, and when setting the number of times of overlapping to N (N≥2) in the overlapping area, the reflectance in the overlapping area where the number of times is N is configured to be lower than the reflectance in the overlapping area where the number of times of overlapping is a largest number of the numbers of times smaller than N.

13 Claims, 7 Drawing Sheets

TILING SCREEN AND MULTI-PROJECTION SYSTEM

The present application is based on, and claims priority from JP Application Serial Number 2020-041633, filed Mar. 31, 2020, the disclosure of which is hereby incorporated by reference herein in its entirety.

BACKGROUND

1. Technical Field

The present disclosure relates to a tiling screen and a multi-projection system.

2. Related Art

In the past, there has been known a multi-projection system which is capable of displaying a single large-screen image by connecting image light beams generated by a plurality of projectors to each other. The plurality of projectors is disposed in such a manner that the image light beams adjacent to each other partially overlap each other so that images projected by the respective projectors are smoothly connected to each other. In that case, in the areas (overlapping areas) where the projection light beams from the plurality of projectors overlap each other, the luminance becomes higher compared to that in an area where the projection light beams do not overlap each other. Further, in the area where the number of times of overlapping is high, the luminance becomes much higher. In contrast, in JP-A-11-288041 (Document 1), there is disclosed the fact that it is possible to display an image with homogenous luminance even in the overlapping areas by disposing a light-blocking cover in a lens part of the projector corresponding to the overlapping areas.

However, in the "method and device of erasing picture seams of a combination of a plurality of projectors," there is obtained an advantage when the number of times of overlapping is the same between the overlapping areas, but it is difficult to deal with when the number of times of overlapping is different between the overlapping areas. Therefore, there arises a problem of dealing with a variation in luminance or a variation in reflectance due to the number of times of overlapping between the overlapping areas.

SUMMARY

A tiling screen according to an aspect of the present disclosure is a tiling screen provided with a plurality of projection areas, including an overlapping area where end parts of the projection areas overlap each other, wherein when setting a number of times of overlapping to one in the overlapping area, reflectance in the overlapping area where the number of times is one is configured to be lower than reflectance in an area where the projection areas fail to overlap each other, and when setting the number of times of overlapping to N (N≥2) in the overlapping area, the reflectance in the overlapping area where the number of times is N is configured to be lower than the reflectance in the overlapping area where the number of times of overlapping is a largest number of the numbers of times smaller than N.

A multi-projection system includes the tiling screen, and a plurality of projection devices configured to project image light beams corresponding respectively to the projection areas toward the projection areas.

DESCRIPTION OF EXEMPLARY EMBODIMENTS

1. First Embodiment

Figure 1:
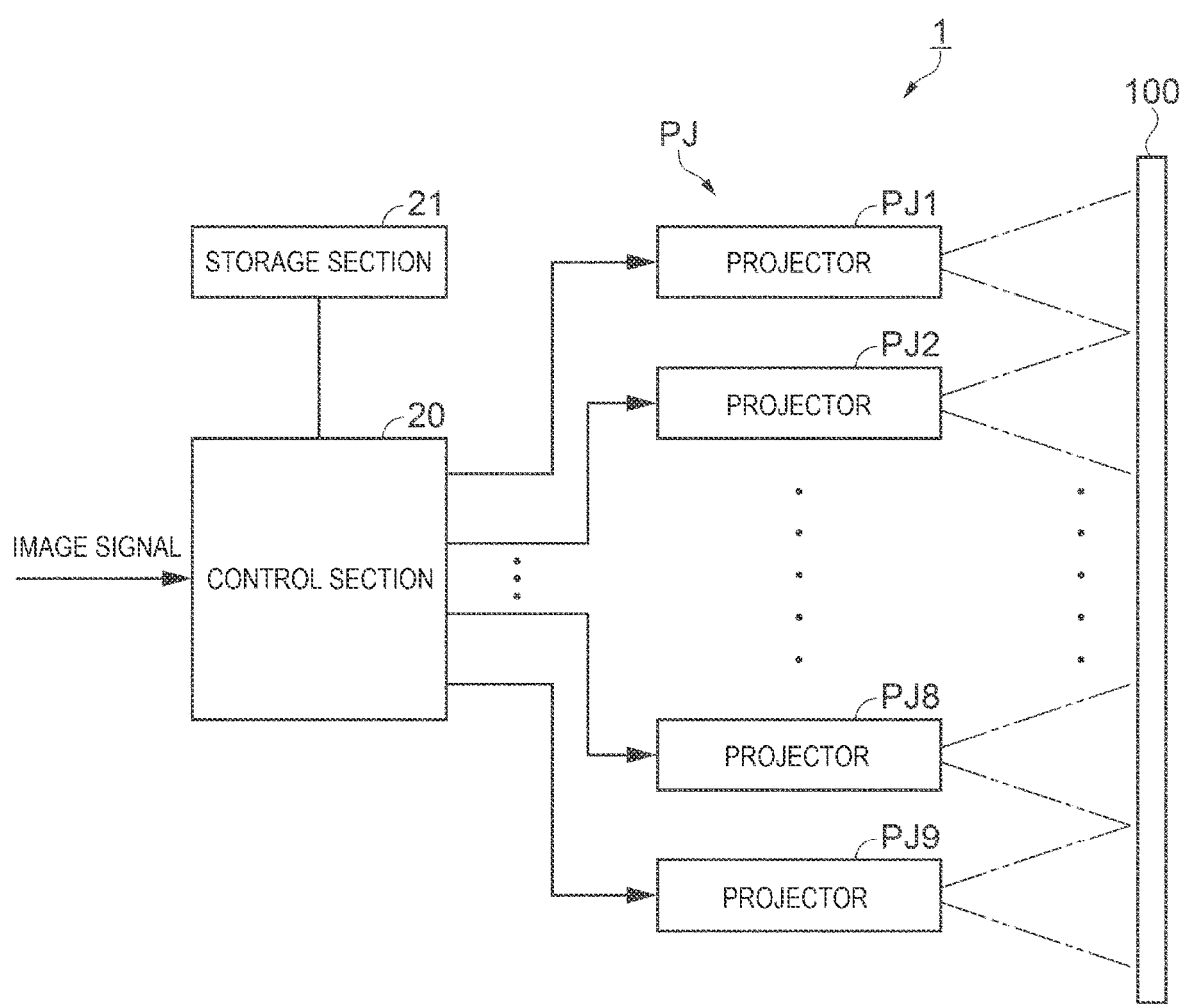
FIG. 1 is a block diagram showing a schematic configuration of a multi-projection system according to a first embodiment.

As shown in FIG. 1, a multi-projection system 1 according to a first embodiment is provided with projectors PJ as an example of a projection device, and a screen 100 as an example of a single tiling screen of a reflective type.

In the present embodiment, as the projectors PJ, there are provided nine projectors PJ. The nine projectors PJ are denoted in sequence by projectors PJ1 through PJ9. Further, the multi-projection system L is provided with a control section 20 for controlling each of the projectors PJ, and a storage section 21.

The operation of the multi-projection system 1 is controlled by the control section 20. Further, the multi-projection system 1 is provided with external terminals not shown, and is capable of receiving an image signal supplied from an external image supply device (not shown).

The control section 20 performs an AD conversion on the image signal received from the external image supply device as needed (when the image signal is an analog signal). Subsequently, a resolution conversion and a variety of image processing for making the image signal correspond to the pixels of liquid crystal panels 341 (see FIG. 2) as an example of light modulation devices 34 of the respective projectors PJ1 through PJ9 are performed, and thus, original image data corresponding to the projection area is generated frame by frame. The original image data is generated color by color, and is formed of a plurality of pixel values each representing a gray level of the corresponding pixel.

The storage section 21 is used for temporary storage when performing the image processing, and is capable of storing the original image data corresponding to at least one frame. When the control section 20 has generated the original image data corresponding to one frame, the control section 20 clips unit image data which each of the projectors PJ1 through PJ9 should be in charge of from the original image data thus generated, and then outputs the unit image data to corresponding one of the projectors PJ1 through PJ9.

The operation of each of the projectors PJ1 through PJ9 is controlled by a projector control section (not shown) provided to the corresponding projector. To the projector control section, there are coupled a data storage section (not shown) for temporarily storing the unit image data and three liquid crystal panel drive sections (not shown) provided for respective colored light beams. When the projector control section has received the unit image data from the control section 20, the projector control section performs the image processing corresponding to the output characteristic of the liquid crystal panel 341. The liquid crystal panel drive section drives each of the liquid crystal panels 341 in accordance with the image processing.

The projectors PJ1 through PJ9 according to the present embodiment are configured having respective configurations the same as each other. The optical systems 30 of the projectors PJ1 through PJ9 will hereinafter be described taking the projector PJ1 as an example.

The projector PJ1 is a device for modulating light emitted from a light source device 31 based on image information to generate an image light beam, and then projecting the image light beam thus generated on a screen 100.

Figure 2:
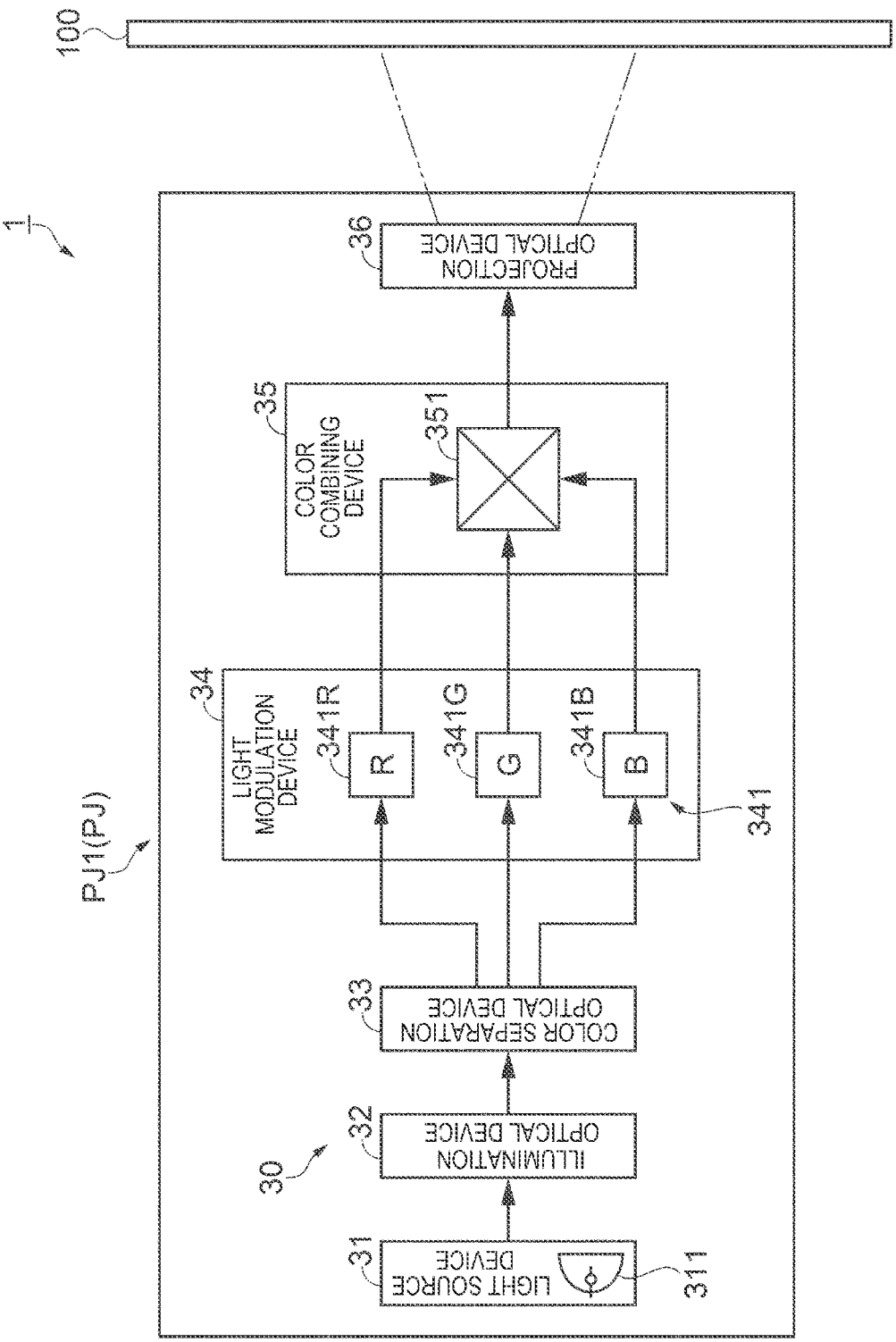
FIG. 2 is a block diagram showing a schematic configuration of an optical system of a projector.

As shown in FIG. 2, the optical system 30 of the projector PJ1 is configured including the light source device 31, an illumination optical device 32, a color separation optical device 33, a light modulation device 34, a color combining device 35, a projection optical device 36, and so on.

The light source device 31 is configured using a light source lamp 311 of a discharge type. The illumination optical device 32 is configured using a lens array, a polarization conversion element, a superimposing lens, and so on all not shown. The light modulation device 34 configured using three liquid crystal panels 341 of a transmissive type provided for the respective colored light beams (a red (R) light beam, a green (G) light beam, and a blue (B) light beam). In particular, the three liquid crystal panels 341 are configured with an R-light liquid crystal panel 341R as an example of a light modulation element for the R light beam, a G-light liquid crystal panel 341G as an example of a light modulation element for the G light beam, and a B-light liquid crystal panel 341B as an example of a light modulation element for the B light beam. The color combining device 35 is configured using a cross dichroic prism 351. The projection optical device 36 is configured including a focusing lens, a zoom lens, and so on all not shown.

The light source device 31 uniforms the emission direction of the light emitted due to light emission by the light source lamp 311, and emits the result toward the illumination optical device 32. The illumination optical device 32 homogenizes the illuminance of the light emitted from the light source device 31 in a plane perpendicular to an illumination light axis, and substantially superimposes the result on the surface of the light modulation device 34 (the liquid crystal panels 341). The color separation optical device 33 separates the illumination light beam emitted from the illumination optical device 32 into three colored light beams, namely the red (R) light beam, the green (G) light beam, and the blue (B) light beam, and then guides the result to the three liquid crystal panels 341 corresponding respectively to the three colored light beams.

The light modulation device 34 modulates the colored light beams having entered the three liquid crystal panels 341 with the liquid crystal panels 341 based on the image information (signals) to form optical images, respectively. The color combining device 35 combines the optical images emitted from the light modulation device 34 for the respective colored light beams using the cross dichroic prism 351, and then emits the optical images thus combined to the projection optical device 36 as the image light beam. The projection optical device 36 has a zoom adjustment function, a focus adjustment function, and so on with respect to the image light beam entering the projection optical device 36 from the color combining device 35 to project the image light beam on the screen 100 in an enlarged manner.

It should be noted that the light source device 31 is not limited to the configuration using the light source lamp 311 of the discharge type, and it is possible to use a semiconductor laser diode or an LED (Light Emitting Diode). Further, the light modulation device 34 is not limited to the liquid crystal panels 341 of the transmissive type, but it is possible to use those using reflective type liquid crystal panels, or those using micromirror type devices such as DMD (Digital Micromirror Devices).

Figure 3:
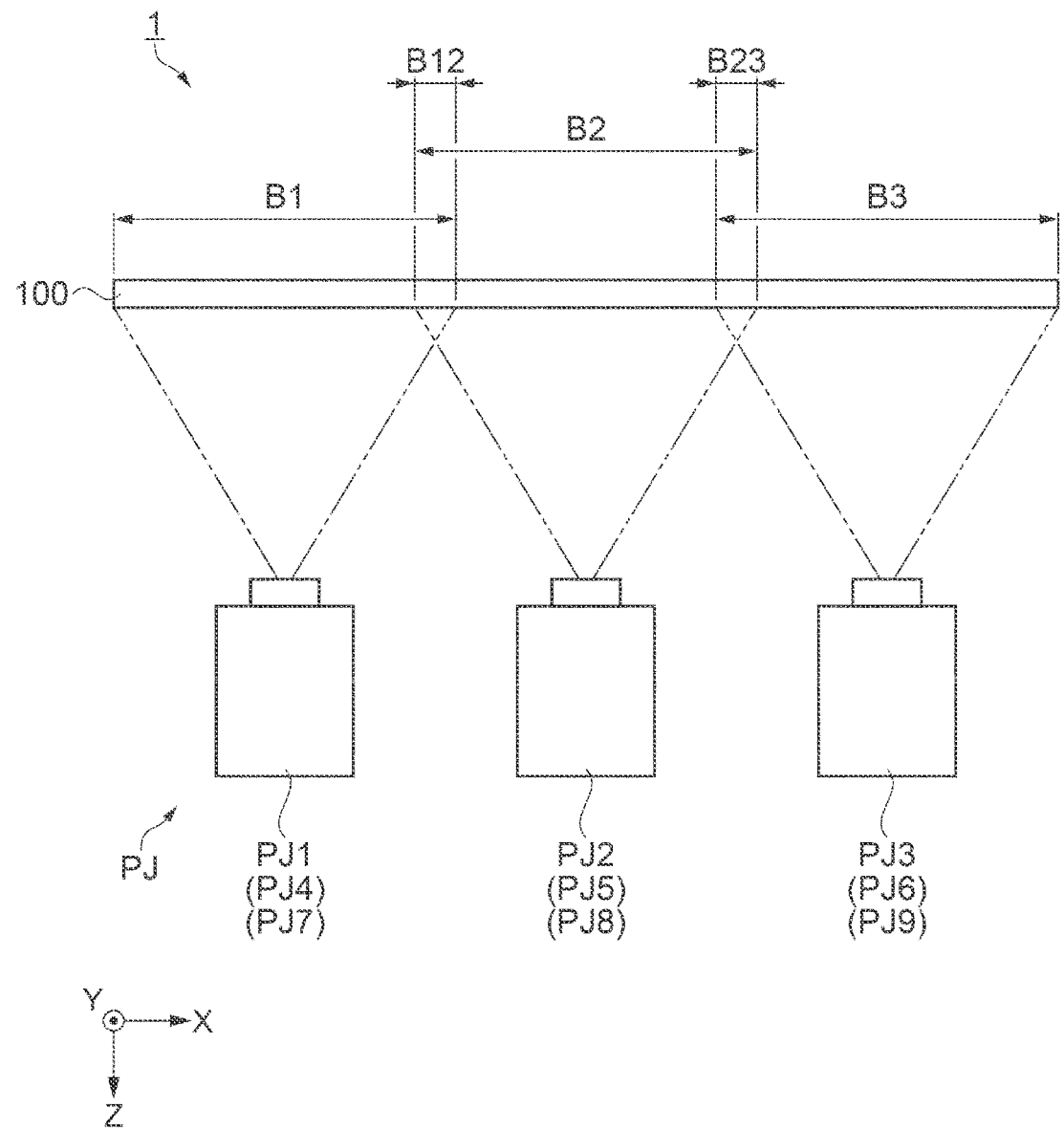
FIG. 3 is a diagram showing a state of the multi-projection system viewed from above.
Figure 4:
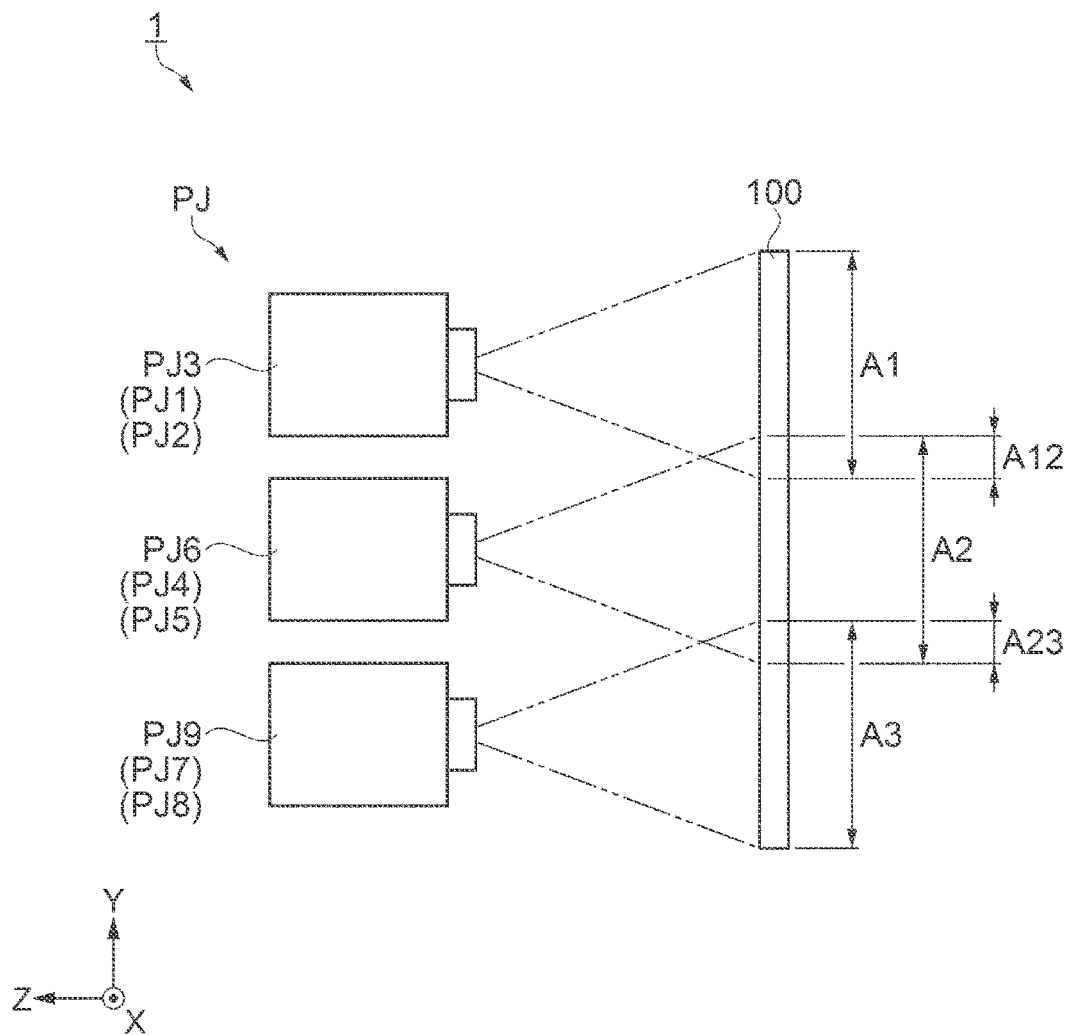
FIG. 4 is a diagram showing a state of the multi-projection system viewed from a lateral side.
Figure 5:
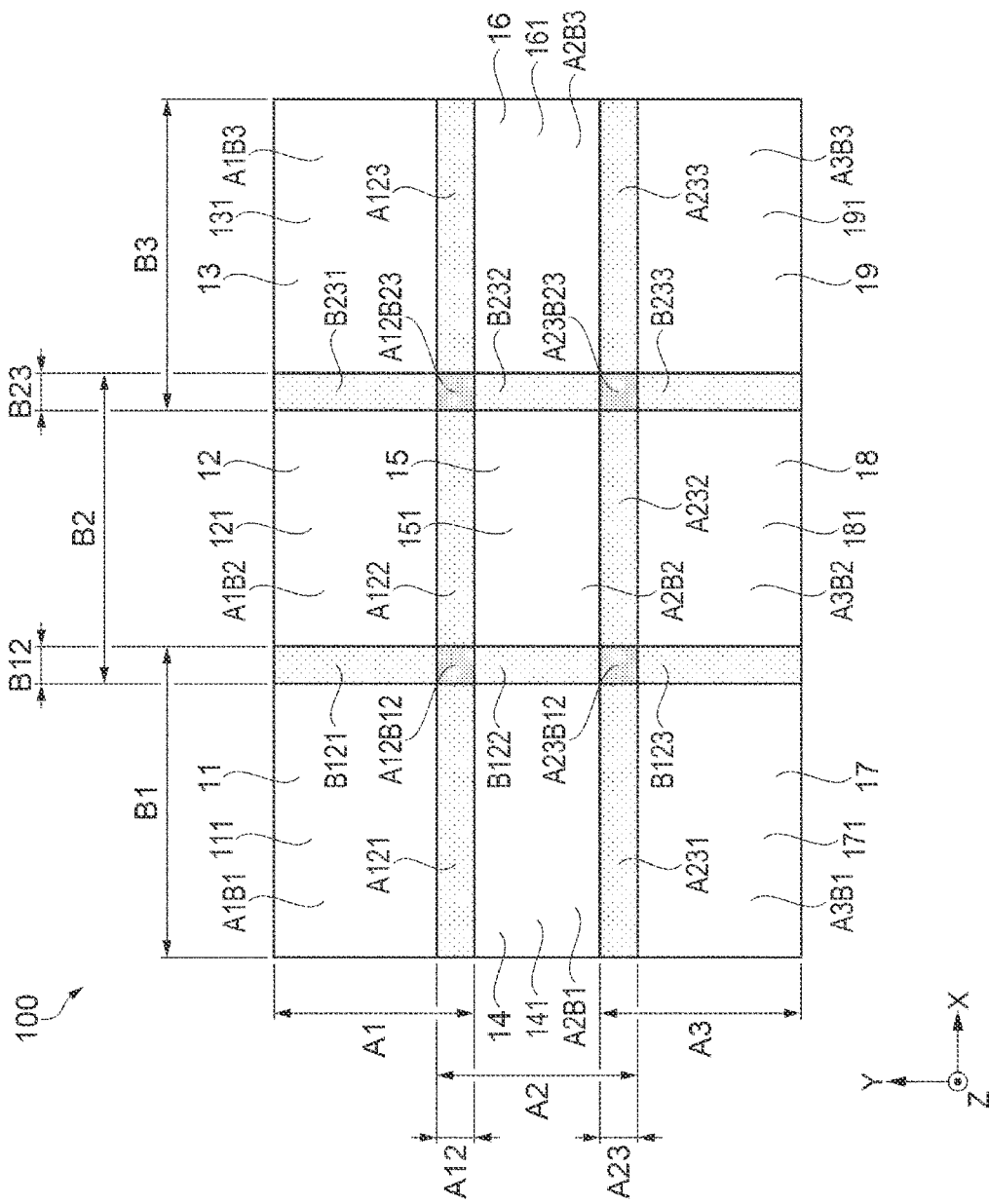
FIG. 5 is a front view showing schematic shapes of projection areas and overlapping areas in a screen.

In particular, FIG. 3, FIG. 4, and FIG. 5 show the state in which the projectors PJ face the corresponding projection areas of the screen 100 at the front thereof, and are each located at substantially the center of the projection area to perform the projection.

It is assumed that the screen 100 in the present embodiment has a rectangular shape, and is installed in parallel to the sidewall surface installed vertically as shown in FIG. 3 through FIG. 5. Further, the vertical direction with respect to the screen 100 having a rectangular shape is defined as an up-down direction of the screen 100. Further, the up-down direction is defined as a Y direction, and the up direction is defined as a +Y direction.

Further, the lateral direction perpendicular to the vertical direction with respect to the screen 100 having a rectangular shape is defined as a right-left direction of the screen 100. The right-left direction is defined as an X direction, and the right direction is defined as a +X direction. Further, a direction perpendicular to the up-down direction and the right-left direction (perpendicular to the surface of the screen 100) is defined as a front-back direction. The front-back direction is defined as a Z direction, and a direction in which the projector PJ is installed with respect to the screen 100 is defined as the front direction (a +Z direction).

As shown in FIG. 3 through FIG. 5, the projectors PJ are installed from the left toward the right in the upper stage in the order of the projector PJ1, the projector PJ2, and the projector PJ3. The projectors PJ are installed from the left toward the right in the middle stage in the order of the projector PJ4, the projector PJ5, and the projector PJ6. Further, the projectors PJ are installed from the left toward the right in the lower stage in the order of the projector PJ7, the projector PJ8, and the projector PJ9.

The multi-projection system 1 generates the image light beams obtained by dividing the single image into nine parts using the nine projectors PJ1 through PJ9. Further, by projecting the image light beams in the predetermined nine projection areas of the screen 100 so as to be connected to each other, a single large-screen image is displayed. It should be noted that the nine projectors PJ1 through PJ9 project the image light beams in such a manner that the image light beams adjacent to each other partially overlap each other so that the images by the image light beams thus projected are displayed in a smoothly connected manner.

In the screen 100, there are arranged three projection areas side by side in each of the upper stage, the middle stage, and the lower stage, and the single image is displayed by the nine projection areas as a whole. Here, the image light beam projected from the projector PJ1 is projected in a first projection area. The first projection area is described as a first projection area A1B1. Alternatively, the first projection area is referred to as a first projection area 11 for the sake of convenience of explanation. The image light beam projected from the projector PJ2 is projected in a second projection area. The second projection area is described as a second projection area A1B2. Alternatively, the second projection area is referred to as a second projection area 12. The image light beam projected from the projector PJ3 is projected in a third projection area. The third projection area is described as a third projection area A1B3. Alternatively, the third projection area is referred to as a third projection area 13.

The image light beam projected from the projector PJ4 is projected in a fourth projection area. The fourth projection area is described as a fourth projection area A2B1. Alternatively, the fourth projection area is referred to as a fourth projection area 14. The image light beam projected from the projector PJ5 is projected in a fifth projection area. The fifth projection area is described as a fifth projection area A2B2. Alternatively, the fifth projection area is referred to as a fifth projection area 15. The image light beam projected from the projector PJ6 is projected in a sixth projection area. The sixth projection area is described as a sixth projection area A2B3. Alternatively, the sixth projection area is referred to as a sixth projection area 16.

The image light beam projected from the projector PJ7 is projected in a seventh projection area. The seventh projection area is described as a seventh projection area A3B1. Alternatively, the seventh projection area is referred to as a seventh projection area 17. The image light beam projected from the projector PJ8 is projected in an eighth projection area. The eighth projection area is described as an eighth projection area A3B2. Alternatively, the eighth projection area is referred to as an eighth projection area 18. The image light beam projected from the projector PJ9 is projected in a ninth projection area. The ninth projection area is described as a ninth projection area A3B3. Alternatively, the ninth projection area is referred to as a ninth projection area 19.

As described above, the nine projection areas 11 through 19 are provided with overlapping areas where end parts of the projection areas 11 through 19 adjacent to each other overlap each other, and non-overlapping areas where the end parts do not overlap each ether. It should be noted that it can be said that the overlapping areas are boundary areas to be boundaries between the projection areas.

Here, the overlapping areas are respectively formed of the first projection area 11 and the second projection area 12, the fourth projection area 14 and the fifth projection area 15, and the seventh projection area 17 and the eighth projection area 18 as the overlapping areas extending in the up-down direction. These overlapping areas are described as overlapping areas B12. Further, the overlapping areas are respectively formed of the second projection area 12 and the third projection area 23, the fifth projection area 15 and the sixth projection area 16, and the eighth projection area 18 and the ninth projection area 19. These overlapping areas are described as overlapping areas B23.

Further, the overlapping areas are respectively formed of the first projection area 11 and the fourth projection area 14, the second projection area 12 and the fifth projection area 15, and the third projection area 13 and the sixth projection area 16 as the overlapping areas extending in the right-left direction. These overlapping areas are described as overlapping areas A12. Further, the overlapping areas are respectively formed of the fourth projection area 14 and the seventh projection area 17, the fifth projection area 15 and the eighth projection area 18, and the sixth projection area 16 and the ninth projection area 19. These overlapping areas are described as overlapping areas A23.

Here, in the overlapping areas A12, A23, B12, and B23, there are formed overlapping areas further overlapping each other. In other words, there are formed the overlapping areas where the four projection areas adjacent to each other overlap each other three times (the four image light beams overlap each other).

In particular, the first projection area 11, the second projection area 12, the four projection area 14, and the fifth projection area 15 form the overlapping area where the overlapping occurs three times. This overlapping area is described as an overlapping area A12B12. Further, the second projection area 12, the third projection area 13, the fifth projection area 15, and the sixth projection area 16 form the overlapping area where the overlapping occurs three times. This overlapping area is described as an overlapping area A12B23.

Further, the fourth projection area 14, the fifth projection area 15, the seventh projection area 17, and the eighth projection area 18 form the overlapping area where the overlapping occurs three times. This overlapping area is described as an overlapping area A23B12. Further, the fifth projection area 15, the sixth projection area 16, the eighth projection area 18, and the ninth projection area 19 form the overlapping area where the overlapping occurs three times. This overlapping area is described as an overlapping area A23B23.

The overlapping areas obtained by excepting the overlapping areas A12B12, A12B23, A23B12, and A23B23 from the overlapping areas A12, A23, B12, and B23 correspond to overlapping areas where the overlapping occurs once (the two image light beams overlap each other).

With respect to the overlapping areas where the number of times of overlapping is one, in the overlapping area B12 where the first projection area 11 and the second projection area 12 overlap each other, the overlapping area except the overlapping area A12B12 is described as an overlapping area B121. In the overlapping area B23 where the second projection area 12 and the third projection area 13 overlap each other, the overlapping area except the overlapping area A12B23 is described as an overlapping area B231.

In the overlapping area A12 where the first projection area 11 and the fourth projection area 14 overlap each other, the overlapping area except the overlapping area A12B12 is described as an overlapping area A121. In the overlapping area A12 where the second projection area 12 and the fifth projection area 15 overlap each other, the overlapping area except the overlapping area A12B12 and the overlapping area A12B23 is described as an overlapping area A122. In the overlapping area A12 where the third projection area 13 and the sixth projection area 16 overlap each other, the overlapping area except the overlapping area A12B23 is described as an overlapping area A123.

In the overlapping area B12 where the fourth projection area 14 and the fifth projection area 15 overlap each other, the overlapping area except the overlapping area A12B12 and the overlapping area A23B12 is described as an overlapping area B122. In the overlapping area B23 where the fifth projection area 15 and the sixth projection area 16 overlap each other, the overlapping area except the overlapping area A12B23 and the overlapping area A23B23 is described as an overlapping area B232.

In the overlapping area A23 where the fourth projection area 14 and the seventh projection area 17 overlap each other, the overlapping area except the overlapping area A23B12 is described as an overlapping area A231. In the overlapping area A23 where the fifth projection area 15 and the eighth projection area 16 overlap each other, the overlapping area except the overlapping area A23B12 and the overlapping area A23B23 is described as an overlapping area A232. In the overlapping area A23 where the sixth projection area 16 and the ninth projection area 19 overlap each other, the overlapping area except the overlapping area A23B23 is described as an overlapping area A233.

In the overlapping area B12 where the seventh projection area 17 and the eighth projection area 18 overlap each other, the overlapping area except the overlapping area A23B12 is described as an overlapping area B123. In the overlapping area B23 where the eighth projection area 18 and the ninth projection area 19 overlap each other, the overlapping area except the overlapping area A23B23 is described as an overlapping area B233.

Further, in the first projection area 11, a non-overlapping area where overlapping does not occur is described as a first non-overlapping area 111. In the second projection area 12, a non-overlapping area where overlapping does not occur is described as a second non-overlapping area 121. In the third projection area 12, a non-overlapping area where overlapping does not occur is described as a third non-overlapping area 131.

In the fourth projection area 14, a non-overlapping area where overlapping does not occur is described as a fourth non-overlapping area 141. In the fifth projection area 15, a non-overlapping area where overlapping does not occur is described as a fifth non-overlapping area 151. In the sixth projection area 16, a non-overlapping area where overlapping does not occur is described as a sixth non-overlapping area 161. In the seventh projection area 17, a non-overlapping area where overlapping does not occur is described as a seventh non-overlapping area 171. In the eighth projection area 18, a non-overlapping area where overlapping does not occur is described as an eighth non-overlapping area 181. In the ninth projection area 19, a non-overlapping area where overlapping does not occur is described as a ninth non-overlapping area 191.

As described above, the non-overlapping areas where overlapping never occurs are the first non-overlapping area 111, the second non-overlapping area 121, the third non-overlapping area 131, the fourth non-overlapping area 141, the fifth non-overlapping area 151, the sixth non-overlapping area 161, the seventh non-overlapping area 171, the eighth non-overlapping area 181, and the ninth non-overlapping area 191. The overlapping areas where the number of times of overlapping is one are located at 12 places, namely the overlapping areas A121, A122, A123, A231, A232, A233, B121, B122, B123, B231, B232, and B233. Further, the overlapping areas where the number of times of overlapping is three are located at 4 places, namely the overlapping areas A12B12, A12B23, A23B12, and A23B23.

In the screen 100 according to the present embodiment, in the nine projection areas, the reflectance in the overlapping area is varied in accordance with the number of times of overlapping. In particular, when assuming the reflectance in the non-overlapping area where overlapping never occurs as 100%, the reflectance is set lower than the reflectance of 100% in the non-overlapping area where overlapping never occurs such as 50% with respect to the overlapping area where the number of times of overlapping is one. In particular, the reflectance in the overlapping areas A121, A122, A123, A231, A232, A233, B121, B122, B123, B231, B232, and B233 where the number of times of overlapping is one is set to 50%.

In other words, it is set that the reflectance becomes 100% when overlapping occurs once (two image light beams overlap each other). Thus, by making the reflectance of the image to be projected in the overlapping area where the number of times of overlapping is one substantially the same as the reflectance of the image to be projected in the non-overlapping area, the variation in luminance in the overlapping area with respect to the luminance in the non-overlapping area is made inconspicuous.

Further, with respect to the overlapping areas where the number of times of overlapping is three, the reflectance in the overlapping areas is made lower than the reflectance of 50% in the overlapping areas where overlapping occurs once such as 25%. In particular, the reflectance of the overlapping areas A12B12, A12B23, A23B12, and A23B23 is set to 25%.

In other words, it is set that the reflectance becomes 100% when overlapping occurs three times (four image light beams overlap each other). Thus, by making the reflectance of the image to be projected in the overlapping area where the number of times of overlapping is three substantially the same as the reflectance of the image to be projected in the non-overlapping area, the variation in luminance in the overlapping area with respect to the luminance in the non-overlapping area is made inconspicuous.

It should be noted that according to the present disclosure, when setting the number of times of overlapping to N (N≥2), the reflectance in the overlapping areas where the number of times of overlapping is N is configured to be lower than the reflectance in the overlapping areas where the number of times of overlapping is the largest number of the numbers of times smaller than N. In the present embodiment, there exist the overlapping areas where the number of times of overlapping is three (N=3), and the overlapping areas where the number of times of overlapping is one (N=1).

Therefore, when the number of times of overlapping becomes the largest number of times of the numbers of times smaller than three is when the number of times is one. Therefore, in the screen 100, when the there is provided the overlapping area where the number of times of overlapping is three (N=3), the reflectance (e.g., 25%) in the overlapping areas where the number of times of overlapping is three is configured to be lower than the reflectance (e.g., 50%) in the overlapping areas where the number of times of overlapping is one.

In the present embodiment, the screen 100 has flexibility, and further has a specification in which printing can be performed on a surface of the screen 100. Therefore, as a device of changing the reflectance in the overlapping area, there is used a large-format printer (not shown). Printing with ink is performed by such a printer in the overlapping areas where the number of times of overlapping is one so that the reflectance becomes 50%. Further, printing with ink is performed in the overlapping areas where the number of times of overlapping is three so that the reflectance becomes 25%. In particular, assuming the ground color (e.g., a white color) of the screen 100 as 100%, printing is performed so that the reflectance becomes 50%, 25%, respectively, by changing the gray level of, for example, a gray color. Alternatively, it is also possible to perform printing so that the reflectance becomes 50%, 25%, respectively by changing the number of black dots or the like.

In the present embodiment, printing is not performed in the non-overlapping areas of the screen 100, and the color of the overlapping areas is changed assuming the ground color (e.g., a white color) of the screen 100 as 100% to thereby be adjusted to the predetermined reflectance. However, it is also possible to perform printing in the non-overlapping areas of the screen 100, and adjust the reflectance of the overlapping areas to the predetermined reflectance by changing the color of the overlapping areas assuming the reflectance of the color thus printed as 100%.

In the present embodiment, printing which corresponds to the reflectance in the overlapping areas is performed using the printer. However, when the screen 100 is large in size, and thus, printing by the printer cannot be performed, it is possible to configure the screen 100 by forming sticker members which are printed in accordance with the reflectance, and are cut in accordance with the shapes of the overlapping areas, and then attaching the sticker members thus formed to the corresponding overlapping areas.

Further, it is also possible to apply coating materials corresponding to the reflectance of the respective overlapping areas to the corresponding overlapping areas of the screen 100. In particular, assuming the white color as 100%, colors which are obtained by changing the gray level of a gray color, which is obtained by mixing, for example, a white color and a black color with each other, so that the reflectance becomes 50%, 25% are applied in the corresponding overlapping areas, it should be noted that when performing the coating, it is efficient to perform the coating using a mask which exposes the places (the overlapping areas) to be coated.

According to the present embodiment, the following advantages can be obtained.

The screen 100 according to the present embodiment has the overlapping areas where the end parts of the plurality of projection areas overlap each other. Further, when setting the number of times of overlapping to one in the overlapping areas, the reflectance in the overlapping areas where the number of times is one is configured to be lower than the reflectance in the areas (the non-overlapping areas) where a plurality of projection areas does not overlap each other. In the present embodiment, when assuming the reflectance in the areas (the non-overlapping areas) where overlapping does not occur as 100%, the reflectance in the overlapping areas when the number of times of overlapping is one is set to 50%. Further, in the overlapping areas, there exist the overlapping areas where the number of times of overlapping is three in the present embodiment, and in that case, the reflectance in the overlapping areas is configured to be lower than the reflectance of 50% in the overlapping areas where the number of times is the largest number of the numbers of times smaller than three, namely one, such as the reflectance of 25%. In other words, when setting the number of times of overlapping to N (N≥2), the reflectance in the overlapping areas where the number of times of overlapping is N is configured to be lower than the reflectance in the overlapping areas where the number of times of overlapping is the largest number of the numbers of times smaller than N.

According to this configuration, the reflectance in the overlapping areas where the number of times is one is configured to be lower than the reflectance in the areas (the non-overlapping areas) where the projection areas do not overlap each other. Further, by adopting the configuration in which the reflectance in the overlapping areas where the number of times N (N≥2) is achieved is lower than the reflectance in the overlapping areas where the number of times is the largest number of the numbers of times lower than N, it is possible to deal with a change in reflectance (a charge in luminance) in accordance with the number of times of overlapping in the overlapping area. Thus, it is possible to suppress the difference in luminance between the overlapping areas. Therefore, it is possible to make the variation in luminance in the overlapping areas with respect to the luminance in the non-overlapping areas.

In the screen 100 according to the present embodiment, the overlapping areas are configured by printing corresponding to the reflectance. According to this configuration, by performing printing using ink in the overlapping areas of the screen 100 so as to obtain the reflectance corresponding to the number of times of overlapping, it is possible to easily deal with the variation in reflectance.

In the screen 100 according to the present embodiment, the overlapping areas are configured by attaching the sticker members corresponding to the reflectance. According to this configuration, by attaching the sticker members formed in accordance with the reflectance to the corresponding overlapping areas of the screen 100 so as to obtain the reflectance corresponding to the number of times of overlapping, it is possible to easily deal with the variation in reflectance.

In the screen 100 according to the present embodiment, the overlapping areas are configured by coating corresponding to the reflectance. According to this configuration, by applying the coating materials corresponding to the reflectance to the corresponding overlapping areas of the screen 100 so as to obtain the reflectance corresponding to the number of times of overlapping, it is possible to easily deal with the variation in reflectance.

The multi-projection system 1 according to the present embodiment is provided with the screen 100 described above, and a plurality of projectors PJ for projecting the corresponding image light beams toward the plurality of projection areas. According to this configuration, since it is possible to deal with the variation in reflectance corresponding to the number of times of overlapping at the tiling screen side without adding control or an optical component at the projector side, it is possible to easily realize the multi-projection system capable of dealing with the variation in reflectance.

According to the multi-projection system 1 related to the present embodiment, the overlapping areas of the screen 100 are provided with printing or the like in accordance with the reflectance, and can therefore be used as a positioning reference when installing the plurality of projectors PJ. Therefore, the installation of the plurality of projectors PJ can easily be performed.

2. Second Embodiment

Figure 6:
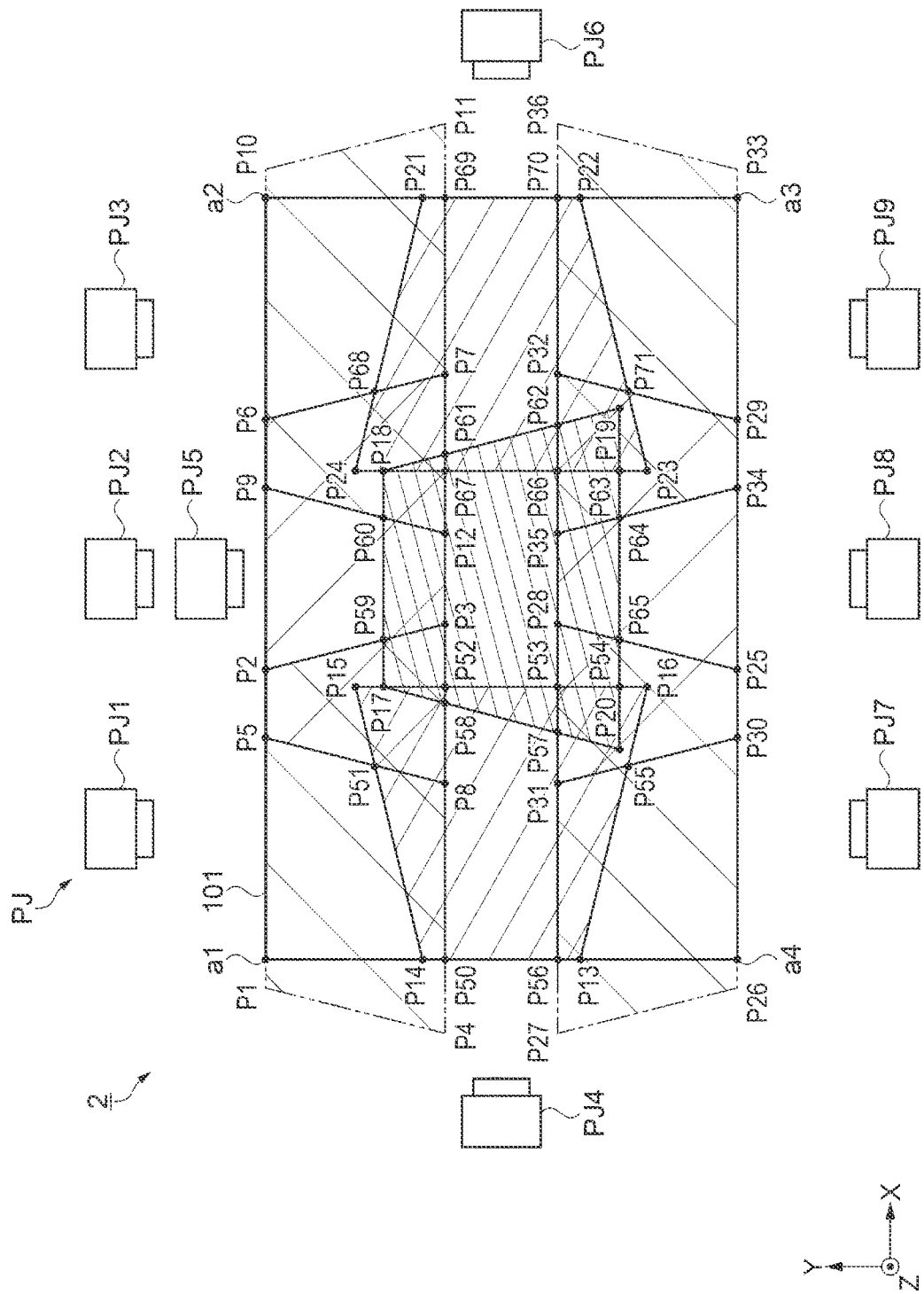
FIG. 6 is a diagram showing a multi-projection system according to a second embodiment.
Figure 7:
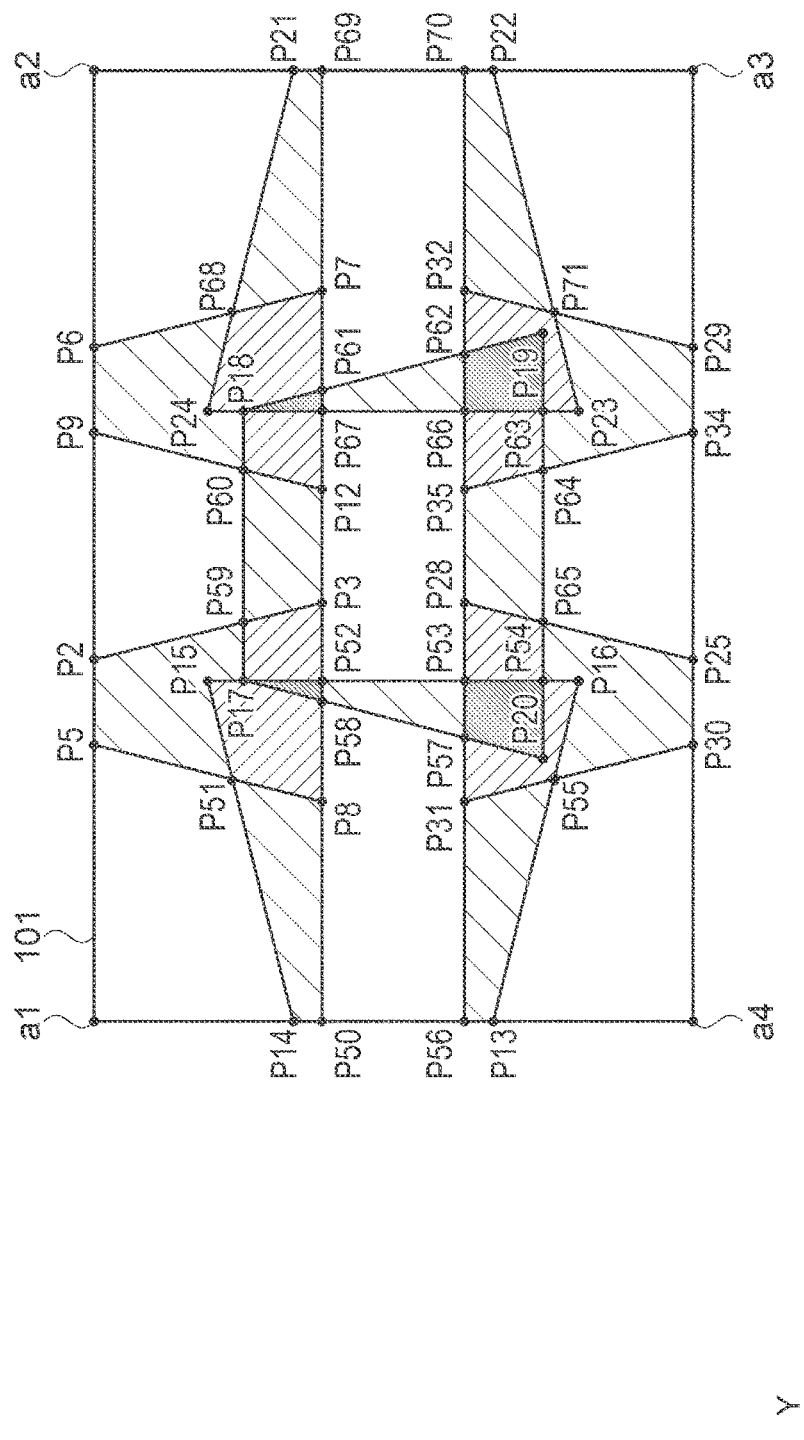
FIG. 7 is a front view showing schematic shapes of projection areas and overlapping areas in the screen.

A multi-projection system 2 according to the present embodiment will be described using FIG. 6 and FIG. 9. It should be noted that FIG. 6 shows in particular a schematic installation positions of the projectors PJ and projection areas with respect to a screen 101. In particular, FIG. 7 shows the projection areas and the overlapping areas in the surface of the screen 101 so as to be divided in accordance with the number of times of overlapping. Further, in FIG. 6 and FIG. 7, the corner parts of the projection areas and the overlapping areas, and the intersections at which the areas crossing each other are additionally attached with serial numbers with P-numbers for the sake of convenience of explanation.

The multi-projection system 2 according to the present embodiment is different in the way of projection to the screen 101 as an example of the tiling screen when being compared to the multi-projection system 1 according to the first embodiment. The rest of the configuration is substantially the same as that of the first embodiment.

In the multi-projection system 1 according to the first embodiment, the projectors PJ have a configuration in which the projectors PJ each face the corresponding projection areas of the screen 100 at the front thereof, and are each located at substantially the center of the projection area to perform the projection. In contrast, in the multi-projection system 2 according to the present embodiment, there is adopted a configuration of so-called tilted projection in which the projector PJ is installed so as to be tilted at a predetermined angle at the predetermined position with respect to the surface of the screen 101 to perform the projection. It should be noted that the projection area which each of the projectors PJ according to the present embodiment is in charge of is substantially the same as in the first embodiment.

As shown in FIG. 6, the first projector PJ1, the second projector PJ2, and the third projector PJ3 which are in charge of the upper stage of the screen 101 are tilted at a predetermined angle at predetermined positions obliquely above the screen 101, and are installed in sequence from the left toward the right. Regarding the projectors PJ in charge of the middle stage of the screen 101, the fourth projector PJ4 in charge of the left side in the middle stage is installed so as to be tilted at a predetermined angle at a predetermined position obliquely left front side of the screen 101. The fifth projector PJ5 in charge of the center in the middle stage is installed so as to be tilted at a predetermined angle at a predetermined position obliquely above the screen 101 and below the second projector PJ2.

The sixth projector PJ6 in charge of the right side in the middle stage is installed so as to be tilted at a predetermined angle at a predetermined position obliquely right front of the screen 101. The seventh projector PJ7, the eighth projector PJ8, and the ninth projector PJ9 which are in charge of the lower stage of the screen 101 are tilted at a predetermined angle at predetermined positions obliquely below the screen 101, and are installed in sequence from the left toward the right.

Here, a geometric correction of the image data will be described.

In the present embodiment, the projectors PJ are installed so as to be tilted with respect to the surface of the screen 101. Therefore, in each of the images by the image light beams projected on the screen 101, there occurs a distortion (a keystone distortion) of expanding in the tilt direction (tilted direction). Therefore, a distortion correction section (not shown) is driven by the control of the projector control section to perform the correction (the geometric correction) of the image data to be input to the liquid crystal panels 341 so that each of the images projected can visually be recognized in a state without a distortion.

The distortion correction section converts the image data (the unit image data) into one with a size corresponding to pixels of an image formation area. Specifically, addition of the pixel values to the image data is performed so as to enlarge the image toward an opposite direction (the direction in which the projection image reduces) to the tilted direction. It should be noted that the pixel values which run off the image formation area having a rectangular shape coinciding with the aspect ratio by the addition of the pixel values are deleted from the image data. Then, the image data having been corrected is output to the liquid crystal panel drive sections. In the images when being output from the projectors PJ due to the drive by the liquid crystal panel drive sections, there is visually recognized a distortion. It should be noted that the pixel value is for determining the light transmission of the pixel, and the intensity (gray level) of the light emitted from the pixel is defined by the pixel value.

As a result, by projecting the image light beam corresponding to the image formation area which has been corrected and newly generated, the distortion in the image is not visually recognized even in the state of being projected in a tilted manner.

As described above, by performing the geometric correction, the image to be projected on the screen 101 becomes to have a trapezoidal shape, but when observing the image from the front with respect to the screen 101, the distortion due to the tilted projection is not visually recognized.

It should be noted that also when performing the geometric correction, similarly to the first embodiment, the image light beams adjacent to each other are projected so as to partially overlap each other so that the images by the image light beams projected from the projectors PJ are displayed in a smoothly connected manner. Therefore, similarly to the first embodiment, in the areas where overlapping occurs, every time the number of times of overlapping increases, the luminance increases.

In the case of the present embodiment, as shown in FIG. 6, the screen 101 is the area having a rectangular shape surrounded by the points a1, a2, a3, and a4. The projection areas in the screen 101 formed due to the projection by the projectors PJ will hereinafter be described.

As shown in FIG. 6, the projection area due to the projection by the first projector PJ1 becomes a trapezoidal area surrounded by the points P1, P2, P3, and P4. The projection area due to the projection by the second projector PJ2 becomes a trapezoidal area surrounded by the points P5, P6, P7, and P8. The projection area due to the projection by the third projector PJ3 becomes a trapezoidal area surrounded by the points P9, P10, P11, and P12.

The projection area due to the projection by the fourth projector PJ4 becomes a trapezoidal area surrounded by the points P13, P14, P15, and P16. The projection area due to the projection by the fifth projector PJ5 becomes a trapezoidal area surrounded by the points P17, P18, P19, and P20. The projection area due to the projection by the sixth projector PJ6 becomes a trapezoidal area surrounded by the points P21, P22, P23, and P24.

The projection area due to the projection by the seventh projector PJ7 becomes a trapezoidal area surrounded by the points P25, P26, P27, and P28. The projection area due to the projection by the eighth projector PJ8 becomes a trapezoidal area surrounded by the points P29, P30, P31, and P32. The projection area due to the projection by the ninth projector PJ3 becomes a trapezoidal area surrounded by the points P33, P34, P35, and P36.

The projection areas in the present embodiment each have the trapezoidal shape. However, in end parts of the image formation areas, the image light beams adjacent to each other partially overlap each other similarly to the first embodiment.

The non-overlapping areas where overlapping never occurs on the surface of the screen 101 due to the projection by the projectors PJ will hereinafter be described.

As shown in FIG. 7, in the screen 101, the areas represented by white become the non-overlapping areas in the projection areas by the projectors PJ. In particular, the non-overlapping area by the first projector PJ1 becomes the area surrounded by the points a1, P5, P51, and P14. The non-overlapping area by the second projector PJ2 becomes the area surrounded by the points P2, P9, P60, and P59. The non-overlapping area by the third projector PJ3 becomes the area surrounded by the points P6, a2, P21, and P68.

The non-overlapping area by the fourth projector PJ4 becomes the area surrounded by the points P50, P58, P57, and P56. The non-overlapping area by the fifth projector PJ5 becomes the area surrounded by the points P52, P67, P66, and P53. The non-overlapping area by the sixth projector PJ6 becomes the area surrounded by the points P69, P70, P62, and P61.

The non-overlapping area by the seventh projector PJ7 becomes the area surrounded by the points a4, P13, P55, and P30. The non-overlapping area by the eighth projector PJ8 becomes the area surrounded by the points P25, P65, P64, and P34. The non-overlapping area by the ninth projector PJ9 becomes the area surrounded by the points P29, P71, P22, and a3.

The overlapping areas where the number of times of overlapping on the surface of the screen 101 due to the projection by the projectors PJ is one will hereinafter be described.

The overlapping areas where the number of times of overlapping is one comprise the area surrounded by the points P5, P2, P59, P17, P15, and P51, and the area surrounded by the points P9, P6, P68, P24, P18, and P60. Further, the overlapping areas where the number of times of overlapping is one comprise the area surrounded by the points P14, P51, P8, and P50, the area surrounded by the points P59, P60, P12, and P3, and the area surrounded by the points P68, P21, P69, and P7.

Besides the above, the overlapping areas where the number of times of overlapping is one comprise the area surrounded by the points P58, P52, P53, and P57, the area surrounded by the points P67, P61, P62, and P66, and the area surrounded by the points P56, P31, P55, and P13. Further, the overlapping areas where the number of times of overlapping is one comprise the area surrounded by the points P28, P35, P64, and P65, the area surrounded by the points P32, P70, P22, and P71, the area surrounded by the points P30, P55, P16, P54, P65, and P25, and the area surrounded by the points P34, P64, P63, P23, P71, and P29.

The overlapping areas where the number of times of overlapping on the surface of the screen 101 due to the projection by the projectors PJ is two will hereinafter be described.

The overlapping areas where the number of times of overlapping is two comprise the area surrounded by the points P51, P15, P17, P58, and P8, the area surrounded by the points P17, P59, P3, and P52, the area surrounded by the points P60, P18, P67, and P12, and the area surrounded by the points P24, P68, P7, P61, and P18.

Besides the above, the overlapping areas where the number of times of overlapping is two comprise the area surrounded by the points P31, P57, P20, P54, P16, and P55, the area surrounded by the points P53, P28, P65, and P54, the area surrounded by the points P35, P66, P63, and P64, and the area surrounded by the points P62, P32, P71, P23, P63, and P19.

The overlapping areas where the number of times of overlapping on the surface of the screen 101 due to the projection by the projectors PJ is three will hereinafter be described.

The overlapping areas where the number of times of overlapping is three comprise the area surrounded by the points P17, P52, and P58, the area surrounded by the points P18, P61, and P67, the area surrounded by the points P57, P53, P54, and P20, and the area surrounded by the points P66, P62, P19, and P63.

As described above, the overlapping areas where the number of times of overlapping is one are located at 12 places. Further, the overlapping areas where the number of times of overlapping is two are located at 8 places. Further, the overlapping areas where the number of times of overlapping is three are located at 4 places. Further, the shapes of the overlapping areas obtained by the division with the number of times of overlapping are each constituted by a variety of types of polygon. In other words, the overlapping areas are configured by a combination of a variety of types of polygons. Further, the reflectance in the overlapping area varies in accordance with the number of times of overlapping. Further, the number of times of overlapping is determined in accordance with the number of projectors which perform projection in the overlapping area.

In the present embodiment, the reflectance in the overlapping area is varied in accordance with the number of times of overlapping similarly to the first embodiment. In particular, when assuming the reflectance in the non-overlapping area where overlapping never occurs as 100%, the reflectance is set lower than the reflectance of 100% in the non-overlapping area where overlapping never occurs such as 50% with respect to the overlapping area where the number of times of overlapping is one.

In other words, it is set that the reflectance becomes 100% when overlapping occurs once (two image light beams overlap each other). Thus, by making the reflectance of the image to be projected in the overlapping area where the number of times of overlapping is one substantially the same as the reflectance of the image to be projected in the non-overlapping area, the variation in luminance in the overlapping area with respect to the luminance in the non-overlapping area is made inconspicuous.

Further, regarding the reflectance in the overlapping areas where the number of times of overlapping is two, the reflectance is set lower than the reflectance of 50% in the overlapping areas where the number of times is one, namely the largest number of the numbers of times smaller than two. In particular, the reflectance in the overlapping areas where the number of times of overlapping is two is set to 33% which is lower than 50% as the reflectance in the overlapping areas where the number of times of overlapping is one.

In other words, it is set that the reflectance becomes 100% when overlapping occurs twice (three image light beams overlap each other). Thus, by making the reflectance of the image to be projected in the overlapping area where the number of times of overlapping is two substantially the same as the reflectance of the image to be projected in the non-overlapping area, the variation in luminance in the overlapping area with respect to the luminance in the non-overlapping area is made inconspicuous.

Further, regarding the reflectance in the overlapping areas where the number of times of overlapping is three, the reflectance is set lower than the reflectance of 33% in the overlapping areas where the number of times is two, namely the largest number of the numbers of times smaller than three. In particular, the reflectance in the overlapping areas where the number of times of overlapping is three is set to 25% which is lower than 33% as the reflectance in the overlapping areas where the number of times of overlapping is two.

In other words, it is set that the reflectance becomes 100% when overlapping occurs three times (four image light beams overlap each other). Thus, by making the reflectance of the image to be projected in the overlapping area where the number of times of overlapping is three substantially the same as the reflectance of the image to be projected in the non-overlapping area, the variation in luminance in the overlapping area with respect to the luminance in the non-overlapping area is made inconspicuous.

In the screen 101 according to the present embodiment, the reflectance (e.g., 50%) in the overlapping areas where the number of times of overlapping is one is configured to be lower than the reflectance (e.g., 100%) in the areas (the non-overlapping areas) where the overlapping never occurs.

The reflectance (e.g., 33%) in the overlapping areas where the number of times of overlapping is two is configured to be lower than the reflectance (e.g., 50%) in the overlapping areas where the number of times is one (the largest number of the numbers of times smaller than two). Further, the reflectance (e.g., 25%) in the overlapping areas where the number of times of overlapping is three is configured to be lower than the reflectance (e.g., 33%) in the overlapping areas where the number of times is two (the largest number of the numbers of times smaller than three). In other words, except when the number of times of overlapping is one, when setting the number of times of overlapping to N (N≥2), the reflectance in the overlapping areas where the number of times of overlapping is N is configured to be lower than the reflectance in the overlapping areas where the number of times of overlapping is the largest number of the numbers of times smaller than N.

The screen 101 according to the present embodiment is configured to have substantially the same specification as that of the screen 100 according to the first embodiment, and therefore, uses a large-format printer (not shown) as a device for changing the reflectance in the overlapping areas similarly to the first embodiment. Printing with ink is performed by such a printer in the overlapping areas where the number of times of overlapping is one so that the reflectance becomes 50%. Further, printing with ink is performed in the overlapping areas where the number of times of overlapping is two so that the reflectance becomes 33%. Further, printing with ink is performed in the overlapping areas where the number of times of overlapping is three so that the reflectance becomes 25%. In particular, assuming the ground color (e.g., a white color) of the screen 101 as 100%, printing is performed so that the reflectance becomes 50%, 33%, 25%, respectively, by changing the gray level of, for example, a gray color. Alternatively, it is also possible to perform printing so that the reflectance becomes 50%, 33%, 25%, respectively by changing the number of black dots or the like.

In the present embodiment, similarly to the first embodiment, printing is not performed in the non-overlapping areas of the screen 101, and the color of the overlapping areas is changed assuming the ground color (e.g., a white color) of the screen 101 as 100% to thereby be adjusted to the predetermined reflectance. However, it is also possible to perform printing in the non-overlapping areas of the screen 101, and adjust the reflectance of the overlapping areas to the predetermined reflectance by changing the color of the overlapping areas assuming the reflectance of the color thus printed as 100%.

In the present embodiment, printing which corresponds to the reflectance in the overlapping areas is performed using the printer. However, when the screen 101 is large in size, and thus, printing by the printer cannot be performed, it is possible to configure the screen 101 by forming sticker members which are printed in accordance with the reflectance, and are cut in accordance with the shapes of the overlapping areas, and then attaching the sticker members thus formed to the corresponding overlapping areas.

Further, it is also possible to apply coating materials corresponding to the reflectance of the respective overlapping areas to the corresponding overlapping areas of the screen 101. In particular, assuming the white color as 100%, colors which are obtained by changing the gray level of a gray color, which is obtained by mixing, for example, a white color and a black color with each other, so that the reflectance becomes 50%, 33%, 25% are applied in the corresponding overlapping areas. It should be noted that when performing the coating, it is efficient to perform the coating using a mask which exposes the places (the overlapping areas) to be coated.

According to the present embodiment, the following advantages can be obtained in addition to the advantages in the first embodiment.

The screen 101 according to the present embodiment can be applied to the case of the so-called tilted projection in which the projector PJ performs the projection obliquely to the surface of the screen 101.

The screen 101 according to the present embodiment can be made to correspond to when performing the tilted projection to form a variety of shapes of overlapping areas.

According to the multi-projection system 2 related to the present embodiment, the overlapping areas of the screen 101 are provided with printing or the like in accordance with the reflectance, and can therefore be used as a positioning reference when installing the plurality of projectors PJ in a tilted manner. Therefore, the installation of the plurality of projectors PJ for the tilted projection can easily be performed.

3. Modified Example 1

The screen 100 according to the first embodiment is the reflective screen, but can also be a transmissive screen. In that case, the present disclosure can be applied by replacing the reflectance in the present embodiment with transmittance. This also applies to the screen 101 according to the second embodiment in substantially the same manner.

4. Modified Example 2

The screen 100 according to the first embodiment is described as the sheet-like configuration having flexibility. However, this is not a limitation, and it is possible to use a sidewall surface fixed indoors or outdoors as the screen. Further, it is also possible to use an indoor ceiling surface as the screen. This also applies to the screen 101 according to the second embodiment in substantially the same manner.

5. Modified Example 3

The screen 101 according to the second embodiment can be applied to performing projection straddling the sidewall surface and the ceiling surface by using both of the sidewall surface and the ceiling surface as the screen. Further, the screen 101 can also be applied to when using a surface including a curved surface as a screen.

6. Modified Example 4

In the multi-projection systems 1, 2 according to the first and second embodiments, there is described when using the nine projectors PJ. However, this is not a limitation, it is possible to use more than nine projectors, or to use less than nine projectors (at least two projectors).

7. Modified Example 5

In the screens 100, 101 according to the first and second embodiments, the reflectance in the overlapping areas different in the number of times of overlapping is set so as become substantially the same finally as the reflectance in the non-overlapping areas when overlapping occurs that number of times of the overlapping. However, this is not a limitation, but it is possible to set the reflectance as long as the reflectance is set along the technical contents of the present disclosure.

What is claimed is:

1. A tiling screen provided with a plurality of projection areas on the surface of the screen, comprising:
an overlapping area where end parts of the projection areas overlap each other, wherein
when setting a number of times of overlapping to one overlapping in the overlapping area, reflectance in the overlapping area where the number of times is one overlapping is configured to be lower than reflectance in an area where the projection areas fail to overlap each other, and
when setting the number of times of overlapping to N (where N≥2) in the overlapping area, the reflectance in the overlapping area where the number of times is N is configured to be lower than the reflectance in the overlapping area where the number of times of overlapping is a number which is the largest number of the numbers of times smaller than N, and
wherein the reflectance of the screen surface of the overlapping area is adjusted by printing which correspondingly affects reflectance of the screen surface of the overlapping area.

2. A multi-projection system comprising:
the tiling screen according to claim 1; and
a plurality of projection devices configured to project image light beams corresponding respectively to the projection areas toward the projection areas.

3. The tiling screen according to claim 1, wherein the reflectance of the screen surface is selectively adjusted by changing a number of black dots printed on the screen surface.

4. The tiling screen according to claim 1, wherein the reflectance of the screen surface is selectively adjusted relative to a predetermined reflectance.

5. The tiling screen according to claim 1, wherein the reflectance of the screen surface is selectively adjusted as a percentage reflectance by adjusting to a corresponding gray color relative to 100% white color, by mixing black and white colors.

6. A tiling screen provided with a plurality of projection areas on the surface of the screen, comprising:
an overlapping area where end parts of the projection areas overlap each other, wherein
when setting a number of times of overlapping to one overlapping in the overlapping area, reflectance in the overlapping area where the number of times is one overlapping is configured to be lower than reflectance in an area where the projection areas fail to overlap each other, and
when setting the number of times of overlapping to N (where N≥2) in the overlapping area, the reflectance in the overlapping area where the number of times is N is configured to be lower than the reflectance in the overlapping area where the number of times of overlapping is a number which is the largest number smaller than N, and
wherein the reflectance of the screen surface of the overlapping area is adjusted by attaching a sticker member which correspondingly affects reflectance of the screen surface of the overlapping area.

7. A multi-projection system comprising:
the tiling screen according to claim 6; and
a plurality of projection devices configured to project image light beams corresponding respectively to the projection areas toward the projection areas.

8. The tiling screen according to claim 6, wherein the reflectance of the sticker member is selectively adjusted relative to a predetermined reflectance.

9. The tiling screen according to claim 6, wherein the reflectance of the screen surface is selectively adjusted as a percentage reflectance by adjusting to a corresponding gray color relative to 100% white color, by mixing black and white colors.

10. A tiling screen provided with a plurality of projection areas on the surface of the screen, comprising:
an overlapping area where end parts of the projection areas overlap each other, wherein
when setting a number of times of overlapping to one overlapping in the overlapping area, reflectance in the overlapping area where the number of times is one overlapping is configured to be lower than reflectance in an area where the projection areas fail to overlap each other, and
when setting the number of times of overlapping to N (where N≥2) in the overlapping area, the reflectance in the overlapping area where the number of times is N is configured to be lower than the reflectance in the overlapping area where the number of times of overlapping is a number which is the largest number smaller than N, and
wherein the reflectance of the screen surface of the overlapping area is adjusted by coating which correspondingly affects reflectance of the screen surface of the overlapping area.

11. A multi-projection system comprising:
the tiling screen according to claim 10; and
a plurality of projection devices configured to project image light beams corresponding respectively to the projection areas toward the projection areas.

12. The tiling screen according to claim 10, wherein the reflectance of the screen surface is selectively adjusted relative to a predetermined reflectance.

13. The tiling screen according to claim 10, wherein the reflectance of the screen surface is selectively adjusted as a percentage reflectance by adjusting to a corresponding gray color relative to 100% white color, by mixing black and white colors.

* * * * *